United States Patent [19]

Meissner

[11] Patent Number: 4,487,227
[45] Date of Patent: Dec. 11, 1984

[54] SPACING INSERT FOR CONCENTRIC FILTER ELEMENTS

[75] Inventor: Paul J. Meissner, Sun Valley, Calif.

[73] Assignee: Meissner Manufacturing Company, Sun Valley, Calif.

[21] Appl. No.: 590,560

[22] Filed: Mar. 19, 1984

Related U.S. Application Data

[63] Continuation of Ser. No. 288,339, Jul. 31, 1981, abandoned, which is a continuation-in-part of Ser. No. 160,906, Jun. 18, 1980, Pat. No. 4,317,727.

[51] Int. Cl.³ .............................................. F15D 1/02
[52] U.S. Cl. ........................................ 138/37; 138/42; 138/103; 138/177; 138/178
[58] Field of Search ................ 138/103, 177, 178, 37, 138/38, 42; 29/163.5 F, 163.5, 136.5 SR; 210/440

[56] References Cited

U.S. PATENT DOCUMENTS

| | | | |
|---|---|---|---|
| 1,165,137 | 12/1915 | Smith | 138/178 X |
| 1,243,168 | 10/1917 | Henderson | 138/38 |
| 1,304,493 | 5/1919 | Layne | 29/163.5 R |
| 2,217,327 | 10/1940 | Zeidler | 29/163.5 |
| 3,083,662 | 4/1963 | Zeidler | 138/38 X |
| 3,279,043 | 10/1966 | Wirt | 29/163.5 R |
| 4,205,545 | 6/1980 | Andrews | 29/163.5 R X |

Primary Examiner—James E. Bryant, III
Attorney, Agent, or Firm—Christie, Parker & Hale

[57] ABSTRACT

An insert for placement between concentric cylindrical filter elements comprises in a one-piece construction a tubular cylindrical body and pairs of parallel slits in the body each forming therebetween a strip of material connected to the remainder of the body at the ends of the strip. The strips are bowed inwardly away from the remainder of the body between their ends to form protrusions extending transversely from the remainder of the body.

7 Claims, 11 Drawing Figures

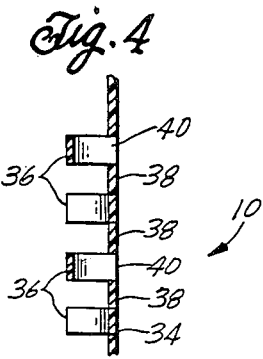
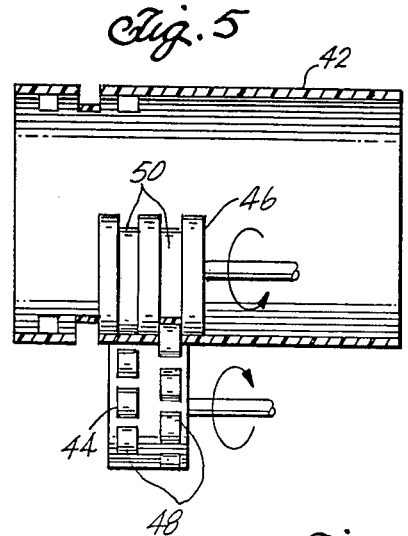
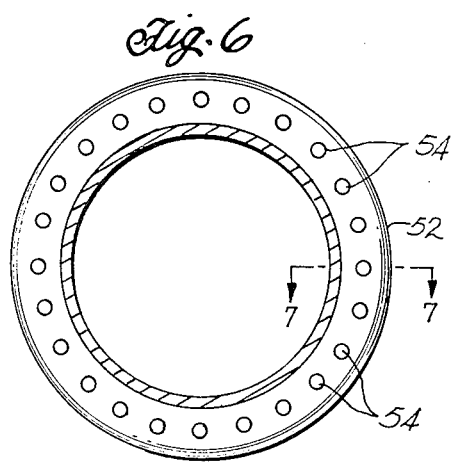
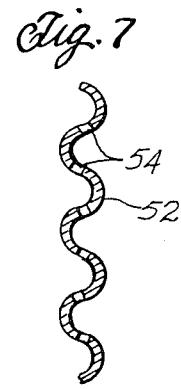
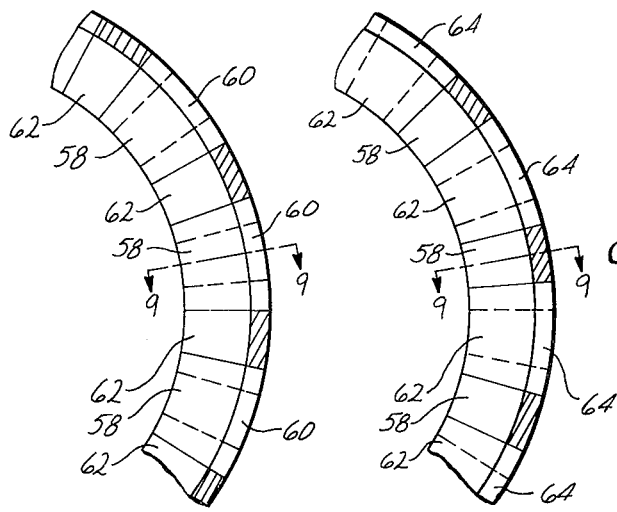
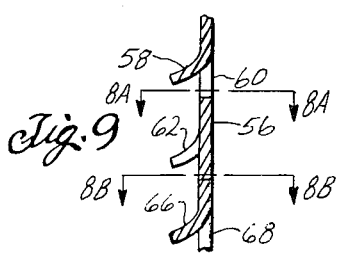

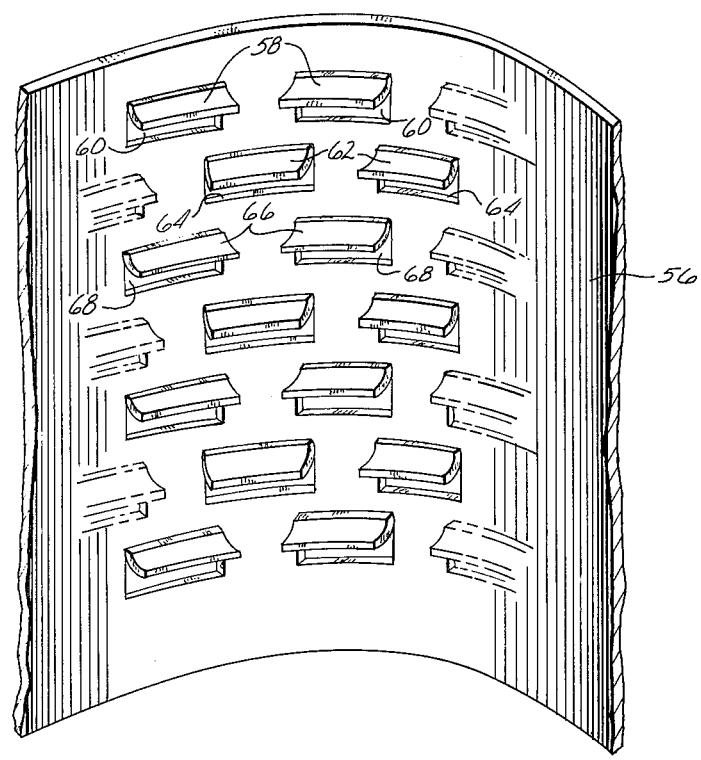

SPACING INSERT FOR CONCENTRIC FILTER ELEMENTS

CROSS-REFERENCE TO RELATED APPLICATIONS

This is a continuation of application Ser. No. 288,339 filed July 30, 1981, now abandoned, which is a continuation-in-part of copending application Ser. No. 160,906, filed on June 18, 1980, now U.S. Pat. No. 4,317,727.

BACKGROUND OF THE INVENTION

This invention relates to fluid filtering and, more particularly, to an insert for a filter cartridge and its method of construction.

One type of filter cartridge in common use employs inner and outer concentric cylindrical filter elements separated by an annular region. The cartridge is mounted in a housing having an inlet communicating with the outer surface of the outer filter element and the inner surface of the inner filter element and an outlet communicating with the annular region. Fluid flows radially inward through the outer filter element and radially outward through the inner filter element to the annular region and then flows axially through the annular region to the outlet. A problem of the described filter cartridge is the tendency of its filter elements to collapse toward the annular region due to the opposing forces exerted thereon by the inlet pressure. This tends to restrict fluid flow to the outlet and to reduce the useful life of the filter elements.

U.S. Pat. No. 3,988,244 teaches the use of a so-called fluid carrier element in the annular space between concentric filter elements in the form of a molded plastic mesh or netting wound about itself several times. The carrier element completely fills the annular region so as to function as a spacer in preventing collapse of the filter elements and permits transverse and axial fluid flow through the annular region by virtue of the openings in the mesh or netting.

SUMMARY OF THE INVENTION

One aspect of the invention is a tubular, preferably single-ply, insert disposed in the annular region between concentric inner and outer filter elements of the above-described type of filter cartridge. The insert has a side wall, perforations formed in the side wall to permit transverse flow through the insert from the filter elements to the annular region, and protrusions extending transversely from the side wall to permit longitudinal flow through the annular region; the side wall and the protrusions together form a spacer between the filter elements.

Another aspect of the invention is a method of constructing a fluid filter cartridge. A first annular pleated filter element having a small diameter is placed inside of a second annular pleated filter element having a large diameter so the elements are concentrically arranged with an annular region therebetween. Partial openings are cut in the side wall of a tubular insert, leaving flaps attached to the remainder of the side wall, and the flaps are permanently deformed away from the remainder of the side wall. The insert is placed in the annular region. The first and second elements and the insert are attached together to form a filter cartridge.

The described insert can be cheaply fabricated and provides a uniformly low, transverse, and axial flow resistance in the region between the filter elements.

BRIEF DESCRIPTION OF THE DRAWINGS

The features of specific embodiments of the best mode contemplated of carrying out the invention are illustrated in the drawings, in which:

FIG. 4 is a side sectional view of a portion of the insert of FIG. 1 taken through plane 4—4 in FIG. 3;

FIG. 5 is a schematic view illustrating how the insert of FIG. 1 is fabricated;

FIG. 6 is a top sectional view of a portion of an alternative embodiment of the insert;

FIG. 7 is a side sectional view of a portion of the insert of FIG. 6 taken through plane 7—7 in FIG. 6;

FIG. 8 is a top sectional view of a portion of another alternative embodiment of the insert of FIG. 1;

FIG. 9 is a side sectional view of a portion of the insert of FIG. 8 taken through plane 9—9 in FIG. 8; and FIG. 10 is a perspective view of a portion of the inside of the insert of FIG. 8.

DETAILED DESCRIPTION OF THE SPECIFIC EMBODIMENTS

Figure 1:
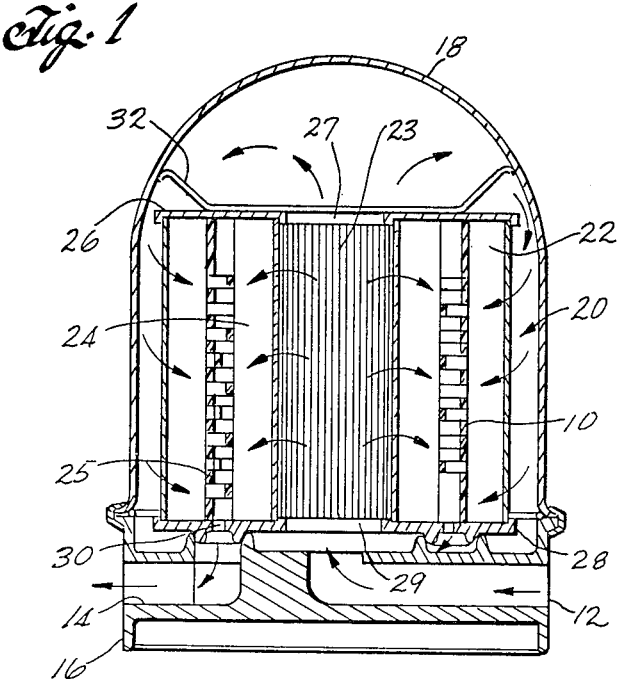
FIG. 1 is a side sectional view of a fluid filter assembly incorporating the principles of the invention.

The filter assembly of FIG. 1 is, with the exception of an insert 10, constructed in the manner described in U.S. Pat. No. 3,988,244, the disclosure of which is incorporated fully herein by reference. An inlet 12 and an outlet 14 are formed in a base 16. Base 16, together with a dome-shaped cover 18, forms a housing for a filter cartridge 20. Cartridge 20 comprises an annular, preferably cylindrical, pleated paper filter element 22 having a large diameter and an annular, preferably cylindrical, pleated paper filter element 24 having a small diameter. Filter elements 22 and 24 are concentrically arranged with an annular region 25 therebetween filled by insert 10. Absent uniformly spaced support by insert 10, the pleats of elements 22 and 24 tend to collapse on each other and to bunch up, due to the pressure difference across the filter assembly in operation. A central passage 23 through cartridge 20 is defined by the inner surface of filter element 24. A rigid upper annular retaining plate 26, which has a central aperture 27, covers the upper ends of filter elements 22 and 24 and annular region 25. A rigid lower annular retaining plate 28, which has a central aperture 29, covers the lower ends of filter elements 22 and 24. Retaining plate 28 has a plurality of annular apertures 30 providing an exit from annular region 25. A strap 32, which is attached to cover 18, serves to seat filter element 20 on base 16 when cover 18 is in place so that central passage 23 lies in sealed communication with inlet 12 and annular apertures 30 lie in sealed communication with outlet 14.

In operation, as illustrated by the arrows, part of the fluid entering inlet 12 flows radially outward from central passage 23 through filter element 24 to annular region 25 and part of the fluid flows through central passage 23 to the outside of cartridge 20 and then radially inward through filter element 22 to annular region 25. From annular region 25, the fluid flows axially to outlet 14.

Figure 2:
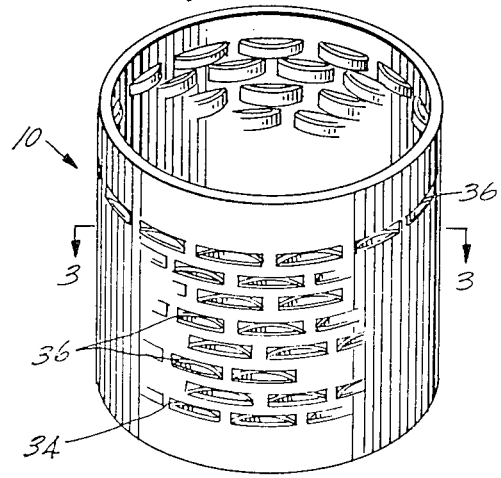
FIG. 2 is a perspective view of the insert shown in FIG. 1.
Figure 3:
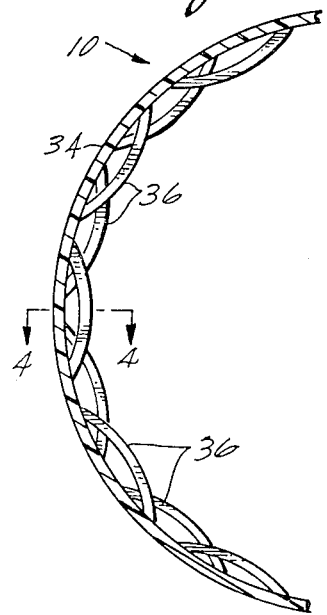
FIG. 3 is a top sectional view of a portion of the insert of FIG. 1 taken through plane 3—3 of FIG. 2.

As depicted in FIGS. 2, 3, and 4, insert 10 comprises in a one-piece, preferably single-ply, construction a tubular cylindrical body 34 and protrusions extending transversely from the side wall of body 34 in the form of inwardly bowed strips of material 36. Strips 36 are formed by parallel slits in the side wall of body 34, leaving strips 36 connected to the side wall at their ends. The slits run perpendicular to the axis of cylindrical body 34. The outer surface of the side wall of body 34 abuts the inner surface of filter element 22 and the inner surface of strips 36 abuts the outer surface of filter element 24. Thus, insert 10 serves as a spacer to hold filter elements 22 and 24 apart despite the opposing forces exerted thereon by the pressure difference. As illustrated in FIG. 2, strips 36 follow a helical path around the side wall of body 34. As illustrated in FIG. 4, adjacent strips 36 are laterally spaced from each other by portions 38 of the side wall of body 34. Each pair of parallel slits, together with strip 36, formed thereby defines an aperture 40 for radial flow of fluid from filter element 22 into annular region 25. Fluid is free to flow radially outward from filter element 24 into annular region 25 in the regions of insert 10 where strips 36 are connected to the side wall of body 34. As illustrated in FIGS. 2 and 3, strips 36 are arranged in staggered rows and columns so vertically, i.e., axially, adjacent strips 36 are overlapping to equalize axial flow resistance around the annular region. The length of strips 36, i.e., the circumferential distance between the ends of the strips, is greater than the spacing therebetween, i.e., the distance between circumferentially adjacent strips, and strips 36 are so arranged that each of strips 36 except those at the top and the bottom of cylindrical body 34, i.e., each interior strip, overlaps two strips in the row above, i.e., on one side thereof, and two strips in the row below, i.e., on the other side thereof, as best shown in FIGS. 2 and 3. By staggering and overlapping vertically adjacent strips 36, the filter pleats of elements 22 and 24 are supported at approximately uniformly spacing over their entire surface area facing annular region 25, thereby preventing collapse or bunching of the filter pleats. Strips 36 thus serve as effective spacers between filter elements 22 and 24 that present a uniformly small axial and radial flow resistance.

Insert 10 could be fabricated by a punch and die operation from commercailly available thin walled plastic PVC pipe; for example, pipe with a 6" diameter and 1/16" wall thickness. As illustrated in FIG. 5, the side wall of a blank 42 in the form of PVC pipe is clamped between a rotatably driven punch wheel 44 and a die wheel 46. Punch wheel 44 has two circumferential rows of bowed cutting teeth 48 for cutting parallel slits in the side wall of blank 42 and permanently deforming the flaps of material formed thereby radially inward to form strips 36 of insert 10. Each row of teeth 48 is arranged in a circle around wheel 44 and lies in a plane perpendicular to the axis of blank 42. Teeth 48 have sharp side edges for cutting the parallel slits in the side wall of blank 42 and ends merging into wheel 44 so the strips of material remain connected to the side wall of blank 42 at their ends. Die wheel 46, which is freely rotatable, has two circular grooves 50, which are aligned with teeth 48. Blank 42 is supported manually by a guide, not shown, so it is fed between wheels 44 and 46 with its axis at a small angle, i.e., 10° to 15°, with the vertical plane in which the axes of wheels 44 and 46 lie. This causes teeth 48 to traverse a helical path around blank 42. The axis of blank 42 lies in a plane perpendicular to the vertical plane. As punch wheel 44 is rotatably driven, blank 42 and die wheel 46 rotate and blank 42 translates axially, while teeth 48 enter grooves 50, thereby cutting the deforming blank 42 to form insert 10.

In a typical embodiment, strips 36 would have a length of between ¾ in. and 1⅛ in. and a width of between 3/16 in. and ¼ in.; the spacing between the outer surface of the side wall of body 34 and the inward facing surface of strips 36 is ⅜ in.; the spacing between adjacent strips 36 is 3/16 in.; and the spacing between strips 36 of a row is 3/16 in. These dimensions may, of course, vary with the conditions.

To construct filter cartridge 20, insert 10 is first fabricated in the manner described above in connection with FIG. 5. Next, filter element 24 is placed into filter element 22 so the elements are arranged concentrically with annular region 25 therebetween. Then, insert 10 is placed in the annular region. Finally, filter elements 22 and 24 and insert 10 are attached together by bonding retaining plates 26 and 28 to the ends of filter elements 22 and 24.

An alternative embodiment of insert 10 is shown in FIGS. 6 and 7. A tubular body 52 has a side wall with annular corrugations which serve as spacers for the concentric filter elements and channels for transverse flow through annular region 25. Perforations 54 are formed in the side wall of body 52 midway between the crests of the corrugations to permit axial flow through annular region 25.

Another alternative embodiment of insert 10 is shown in FIGS. 8 and 9. A tubular body 56 has cuts producing a plurality of rows of flaps, i.e., a row of flaps in the form of louvers 58 and apertures 60, a row of flaps in the form of louvers 62 and apertures 64, a row of flaps in the form of louvers 66 and apertures 68, etc. Louvers 58, 62, and 66 have one edge connected to the side wall of body 56 and an opposite edge extending transversely therefrom. Preferably, the circumferential lengths of the louvers in each row are greater than the spacing between circumferentially adjacent louvers in the row to permit overlapping and louvers in axially, adjacent rows are staggered (i.e., louvers 58 with respect to louvers 62 and louvers 62 with respect to louvers 66) and overlapping in analogous fashion to strips 36 so as to equalize axial flow resistance around the annular region and uniformly space the filter pleats of elements 22 and 24. Thus, louvers 58 serve as spacers between the concentric filter elements and apertures 60 permit radial fluid flow from the filter element to the annular region.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention. For example, the described insert could be employed to space a single filter element from an impervious annular element as depicted in FIG. 4 of U.S. Pat. No. 3,988,244. Although it is preferable to use a single-ply insert, some features of the invention are applicable to multiple-ply inserts. Strips 36 could extend all the way to the end of body 34 instead of as shown in FIG. 2.

What is claimed is:

1. An insert adapted to be placed concentric cylindrical filer elements, the insert consisting essentially of a single walled construction which comprises:

a tubular cylindrical body; and a plurality of cuts in the body, each forming a flap connected to the remainder of the body and permanently deformed so as to form a protrusion extending transversely from the remainder of the body and an aperture in the remainder of the body, the flaps being uniformly arranged in staggered generally circumferential rows, and wherein the lengths of the flaps are greater than the distance between circumferentially adjacent flaps such that each flap in one row overlaps two flaps in each axially adjacent row.

2. The insert of claim 1 in which the flaps extend inwardly from the remainder of the body.

3. The insert of claim 1 in which each cut forms a louver connected to the remainder of the body along one edge and unconnected to the body along another edge, the other edge of the louvers protruding transversely from the remainder of the body, the louvers being wider than the spacing between circumferentially adjacent louvers.

4. The insert of claim 1 in which the flaps follow a helical path around the side wall.

5. An insert adapted to be placed between concentric cylindrical filter elements, the insert consisting essentially of a single walled construction which comprises:

a tubular cylindrical body; and a plurality of pairs of circumferentially extending parallel slits in the body each forming a flap connected to the remainder of the body at both ends and permanently deformed so as to bow away from the remainder of the body between the ends of the flap, thereby forming a protrusion extending transversely from the remainder of the body and an aperture in the remainder of the body, the distance between the ends of the flaps being greater than the distance between circumferentially adjacent flaps, and wherein the flaps are uniformly arranged in staggered generally circumferential rows such that each flap in one row overlaps two flaps in each axially adjacent row.

6. The insert of claim 5, in which the flaps extend inwardly from the remainder of the body.

7. The insert of claim 5, in which the flaps follow a helical path around the side wall.

* * * * *